(No Model.)

J. M. RILEY.
HOOK.

No. 331,160. Patented Nov. 24, 1885.

WITNESSES
A. A. Connolly
Theo. A. Watterson

INVENTOR
John M. Riley
by Connolly Bros
Attorneys

UNITED STATES PATENT OFFICE.

JOHN M. RILEY, OF NEWARK, NEW JERSEY.

HOOK.

SPECIFICATION forming part of Letters Patent No. 331,160, dated November 24, 1885.

Application filed August 4, 1885. Serial No. 173,559. (No model.)

*To all whom it may concern:*

Be it known that I, JOHN M. RILEY, a citizen of the United States, and a resident of Newark, in the county of Essex and State of New Jersey, have invented certain new and useful Improvements in Hooks, of which the following is a specification, reference being had to the accompanying drawings, in which—

Figure 1:
Figure 2:
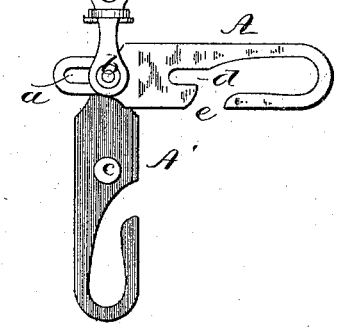
Figure 3:
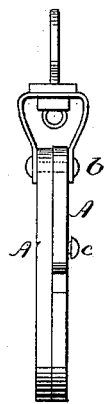
Figure 4:

Figure 1 is a side view of the hook closed. Fig. 2 is a side view of the hook opened. Fig. 3 is an edge view. Fig. 4 is a side view of a modification.

My invention has relation to that class of hooks in which one part is pivotally connected to the other and a locking device employed to insure a secure fastening and prevent the hook from accidentally opening when subject to strain.

My invention has for its object the provision of a hook of novel construction wherein springs or equivalent devices are dispensed with and the locking or unlocking of the hook is effected by a simple lengthwise movement of one of its parts on the pivot or bearing-stud by which the two sections of the hook are connected together, the movable section being formed with a longitudinal slot, through which the said pivot passes and being also formed with a notch which engages or interlocks with a stud or catch on the other section, all as hereinafter more fully described and claimed.

Referring to the accompanying drawings, which show a form of hook embodying my invention, and which may be used either with or without a swivel, A A' designate the two sections of the hook, which are preferably made similar in outline—that is, in the form of two hooks arranged in opposite relation to one another and side by side. The plate A is formed with the longitudinal slot $a$ at or near one end, through which passes the pivot $b$, connecting the two plates together. The plate A' is provided with the stud or catch-pin $c$, which, when the plates are interlocked, enters a notch, $d$, in the plate A and prevents the two sections of the hook from diverging. The purpose of the slot $a$ is to afford the plate A a longitudinal movement in order that it may be engaged with and disengaged from the stud $c$. In opening or closing the hook the stud $c$ moves through the opening $e$ in the hook-plate A.

A modification of my invention is shown in Fig. 4, wherein I substitute for the hook member or plate A' the casing D, consisting of a plate bent to a U form and embracing the sides and one edge of the hook-plate A, the other edge being open to permit the casing to be swung outwardly on the pivot at its upper end.

Having fully described my invention, I claim—

1. A safety-hook consisting of two sections coupled together by means of a pivot, $b$, one of said sections being a hook and having at one end a longitudinal slot, $a$, for the passage of the coupling-pivot, said section being also provided with a longitudinal open notch, $d$, while the other section is elongated, so as to close the mouth of the hook-recess when the two sections are interlocked, and is provided with a stud, $c$, which engages with notch $d$ when the hook-section is moved laterally and longitudinally, substantially as described.

2. A safety-hook consisting of two similarly-shaped hook-plates united at one end by means of a pivot, one of said plates being provided with a longitudinal slot at its pivotal end for the passage of the pivot, and with a longitudinal open notch communicating with the hook-recess at the inner end of the latter, while the other plate is provided with a stud located between its hook portion and its pivotal end, adapted to enter and engage with said notch when the hook-plates are interlocked, substantially as shown and described.

Signed at Newark, in the county of Essex and State of New Jersey, this 21st day of July, A. D. 1885.

JOHN M. RILEY.

Witnesses:
    THOMAS C. PROVOST,
    JOHN TREHAVEN.